(12) United States Patent  
Basil

(10) Patent No.: US 9,219,844 B2
(45) Date of Patent: Dec. 22, 2015

(54) INTELLIGENT FAX RETRANSMISSION SYSTEM AND METHOD

(71) Applicant: Axacore, Inc., San Diego, CA (US)

(72) Inventor: Nicholas J. Basil, San Diego, CA (US)

(73) Assignee: SCRYPT, INC., Austin, TX (US)

( * ) Notice: Subject to any disclaimer, the term of this patent is extended or adjusted under 35 U.S.C. 154(b) by 0 days.

(21) Appl. No.: 14/514,913

(22) Filed: Oct. 15, 2014

(65) Prior Publication Data

US 2015/0103384 A1 Apr. 16, 2015

Related U.S. Application Data

(60) Provisional application No. 61/891,362, filed on Oct. 15, 2013.

(51) Int. Cl.
*G06F 1/32* (2006.01)
*H04N 1/32* (2006.01)

(52) U.S. Cl.
CPC ....... *H04N 1/32619* (2013.01); *H04N 1/32128* (2013.01); *H04N 1/32641* (2013.01); *H04N 1/32667* (2013.01); *H04N 2201/3216* (2013.01); *H04N 2201/3219* (2013.01); *H04N 2201/3232* (2013.01); *H04N 2201/3278* (2013.01)

(58) Field of Classification Search
CPC ................ G06K 9/00369; G06K 9/62; H04N 21/44222; H04N 21/42201; H04N 2005/91364; H04N 5/782; H04N 5/913; H04N 21/47; H04N 21/44008; H04N 1/33369; H04N 21/4318; H04N 21/482; H04N 2201/3219; H04N 1/03

USPC .......... 358/407, 402, 1.15, 405, 412, 426.03, 358/435; 709/201, 200, 202, 203, 223, 227, 709/239
See application file for complete search history.

(56) References Cited

U.S. PATENT DOCUMENTS

| | | | | |
|---|---|---|---|---|
| 4,713,780 | A * | 12/1987 | Schultz et al. | 709/206 |
| 5,031,179 | A * | 7/1991 | Yoshida et al. | 714/748 |
| 5,825,990 | A * | 10/1998 | Heo et al. | 358/1.14 |
| 5,838,459 | A * | 11/1998 | Hashimoto | 358/402 |
| 5,973,791 | A * | 10/1999 | Yamamuro et al. | 358/403 |
| 6,400,996 | B1 * | 6/2002 | Hoffberg et al. | 700/83 |
| 6,700,674 | B1 * | 3/2004 | Otsuka et al. | 358/1.15 |
| 7,054,899 | B1 * | 5/2006 | Yamamoto | 709/202 |
| 7,151,614 | B1 * | 12/2006 | Umansky et al. | 358/1.15 |
| 7,218,424 | B2 | 5/2007 | Cohen | |
| 7,408,681 | B2 | 8/2008 | Tanimoto | |
| 7,480,065 | B1 | 1/2009 | Trandal et al. | |
| 8,081,332 | B2 | 12/2011 | Nagarajan et al. | |
| 8,081,337 | B2 | 12/2011 | Trandal et al. | |

(Continued)

*Primary Examiner* — Negussie Worku
(74) *Attorney, Agent, or Firm* — J. Curtis Edmondson; Law Offices of J. Curtis Edmondson

(57) ABSTRACT

Described herein is a fax processing system for the improvement of efficiency and reliability of fax transmissions over any communications network, specifically for retransmitting an incomplete transmission. Fax images are encoded with an embedded digital bit signal by a fax software program on the originating fax that indicates the number of pages in the document where such bit signal is recognized by fax software at a fax service for the purpose of monitoring the page count of the transmission, and in the case of a failed transmission, using the embedded digital data to notify the recipient that more pages will be transmitted, and further transmitting the remaining pages on the next facsimile phone call.

20 Claims, 4 Drawing Sheets

(56) References Cited

U.S. PATENT DOCUMENTS

| | | |
|---|---|---|
| 8,199,349 B2 | 6/2012 | Narahara |
| 8,237,956 B2 * | 8/2012 | Levine .................... 358/1.15 |
| 8,237,963 B2 * | 8/2012 | Urakawa ................. 358/1.15 |
| 8,243,314 B2 | 8/2012 | Oliszewski |
| 8,339,346 B2 | 12/2012 | Li et al. |
| 8,670,162 B2 * | 3/2014 | Hoshino .................... 358/442 |
| 2005/0190404 A1 * | 9/2005 | Nakamura ............... 358/1.15 |
| 2005/0275874 A1 | 12/2005 | Rothwell |
| 2008/0007789 A1 | 1/2008 | La |
| 2008/0242422 A1 * | 10/2008 | Kropivny .................... 463/42 |
| 2008/0244013 A1 * | 10/2008 | Kropivny .................... 709/206 |
| 2009/0109477 A1 * | 4/2009 | Oomura et al. ........... 358/1.15 |
| 2009/0303548 A1 | 12/2009 | Harrington |
| 2010/0092095 A1 * | 4/2010 | King et al. ................ 382/229 |
| 2011/0096369 A1 | 4/2011 | Trandal et al. |
| 2012/0087484 A1 | 4/2012 | Trandal et al. |
| 2014/0098406 A1 * | 4/2014 | Hama ....................... 358/434 |
| 2014/0253574 A1 * | 9/2014 | Brown et al. ............. 345/545 |
| 2014/0317187 A1 * | 10/2014 | Tsujimoto ................ 709/204 |
| 2015/0103379 A1 * | 4/2015 | Basil ........................ 358/1.15 |

* cited by examiner

INTELLIGENT FAX RETRANSMISSION SYSTEM AND METHOD

CROSS-REFERENCE TO RELATED APPLICATIONS

The present application claims the benefit of U.S. Provisional Patent Application No. 61/891,362, filed on Oct. 15, 2013 and entitled "Intelligent Fax Retransmission System and Method" which is herein incorporated by reference in its entirety.

BACKGROUND

The inventive subject matter relates to computer and facsimile transmissions, specifically a method to monitor the page count of a facsimile document during transmission, and convey the page count information to the sender in the case of a dropped or failed transmission, and to retransmit only the missing pages in the next transmission.

The electronic transmission of documents by way of fax systems continues to be commonplace and, often, an essential component of many business activities. With the emergence of email and mobile computing devices in the business environment, many predicted the demise of fax, however fax continues to thrive and grow as it is the only means of communication to the existing base of fax machines, can print out paper, and offers compliance to many financial and regulatory requirements. With the growth of document services and document requirements from federal regulations such as HIPAA (Health Insurance Portability and Accountability Act) and SOX (Sarbanes-Oxley Act), faxing as a method of communications has continue to thrive and grow in volume, as well as the number of multi-page documents being transacted.

Facsimile ("fax" or "faxing") has been an important part of business communications for over 20 years. It is a secure, and reliable way to send a document from one place to another and provides a confirmation of receipt. There have been few changes to the actual fax transmissions or speed since the early 1990's. With the growth of VoIP and the growth of fax, more problems are introduced to the fax process such as dropped calls, incomplete faxes, and longer documents that can take long periods of time sending. The current method of page counting is to have the fax sender hand write the number of pages on a fax cover sheet.

A problem with some fax systems is "dropped" or incomplete transmissions due to poor phone line connections, which in part is caused by the growth of VoIP (Voice over Internet). Fax transmissions that were originally designed around the PSTN (Public Switched Telephone Network) have more difficulty completing transmissions and require several retries to complete in the VOIP environment. Also as the number of pages increases, the chances of successful transmissions decrease. Also, there is no page counting system in the fax protocol, so that a 100 page fax that cannot complete after 90 pages will start anew at page 1 the next attempt. This system results in confusion for the recipient that receives multiple copies of some pages, is not sure when the fax is complete, and also results in continued and longer transmissions rather than sending only the remaining missing pages.

Embodiments of the present inventive subject matter overcome problems in the current fax system and in prior art of fax systems by creating intelligence within a fax document and the fax system to know the expected page count of said document. In the common case of an incomplete transmission, this intelligence allows the system to alert the fax recipient the number of expected pages and the number of remaining pages, and to alert the sending fax system to send the retransmission commencing at page "X", thus avoiding having to resend the pages that have already been completed. Embodiments of the present inventive subject matter are both novel in its approach to increase fax intelligence and reliability, and non-obvious in its method and approach.

Non-facsimile-communication-protocol/non-facsimile-image digital data may be reproduced by a non-featured facsimile machine, but the non-facsimile-communication-protocol/non-facsimile-image digital data will be rendered in a manner that does not produce intelligible human-readable information to the recipient.

Non-facsimile-communication-protocol/non-facsimile-image digital data is also multi-bit digital data representing non-facsimile-communication-protocol information wherein facsimile-communication-protocol information is signals or instructions to create/facilitate a communication channel between a transmitting device and a receiving device.

In summary, non-facsimile-communication-protocol/non-facsimile-image digital data is machine readable data that is transmitted in addition to conventional facsimile data wherein if the non-facsimile-communication-protocol/non-facsimile-image digital data is reproduced by the receiving facsimile machine, the non-facsimile-communication-protocol/non-facsimile-image digital data does not produce intelligible human-readable information as the receiving facsimile machine would render the concurrently transmitted conventional facsimile data.

DEFINITION OF TERMS

The following term definitions are provided to assist in conveying an understanding of the various exemplary embodiments and features disclosed herein.

The terms "facsimile" and "fax" shall be used interchangeably and refer to data that is transmitted on the protocol generically known as "T.30".

Telephony: The transmission of audio signals on a PSTN ("Packet Switched Telephony Network") according to generally accepted protocols.

T.30: The protocol for the transmission of facsimile documents that conform to the "Group-3" protocol.

PSTN: The public switched telephone network (PSTN) is the network of the world's public circuit-switched telephone networks.

Facsimile Information Fields (FIF): Information fields of variable length that contain specific information for the control and message interchange between two facsimile terminals CSID: Customer Subscriber ID Non Standard Capabilities: Refers to the NSF (Non Standard Facilities), NSC (Non Standard Facilities Command), and NSS (Non Standard Facilities Set-up)

Several different telephone line modulation techniques are used by fax machines. They are negotiated during the fax-modem handshake, and the fax devices will use the highest data rate that both fax devices support, usually a minimum of 14.4 kbit/s for Group 3 fax.

V.27: 2400 and 4800 bits/second
V.29: 4800, 7200, and 9600 bits/second
V.17: 7200, 9600, 12,200, and 14,400 bits/second
V.34bis: 28,800 and 33,600 bits/second Data Communications Speeds: refers to data rate transfer speeds found on wired or wireless data network connections. There is a large range of available speeds which can go to 10

Mbps (megabits/second) or much higher, versus fax connection speeds as described above.

SUMMARY OF THE INVENTION

It is an object to provide a fax processing system overcomes some or all of the drawbacks discussed above. Embodiments of the present inventive subject matter are intended to provide a system and method for the intelligent retries of failed facsimile transmissions, which delivers the completed fax faster than previously accomplished, and links the two or more transmissions together which has not been previously done. One object is to count the pages in the facsimile image being sent and to monitor the count of pages successfully and not successfully transmitted.

Another object is to encode the first page of a fax image with a code of bits that are recognized by a software decoder program at the fax service provider or fax server recipient. The software decoder program has the capability to recognize the encoded bits in the image, and also has the capability to recognize in the T.30 header, the Non Standard Facilities code ("NSF"), Customer Subscriber Identification ("CSID"), and from the telecommunications system, the phone number from the originating device via Automatic Number Identification ("ANI") or Caller Identification ("Caller ID") and the time of the originating facsimile call. When the software decoder program recognizes such above described codes, the software confirms that the originating fax call comes from the PC Fax program installed and operating on the originating computing device, the software application signals the fax program with an acknowledgement. After the acknowledgement signal, the fax program uses the T.30 fax protocol to commence transmission of the facsimile image data.

Another object is the fax software decoder will send a message to the fax recipient indicating the number of pages that were successfully received, the number of pages that were not successfully received, and a message indicating that the remaining pages will be received as soon as possible.

Another object is to reduce the telephony and computing resources used by the fax service by, in the case of incomplete transmissions, only sending the remaining pages of an incomplete facsimile document, rather than the entire document including the pages that were already transmitted.

Another object is the fax software encoder will, in the case of an incomplete transmission, initiate a second transmission commencing at the first page of the facsimile image data that was not delivered, based on the message received from the fax software decoder program. This procedure will continue until the entire document is successfully transmitted to the intended recipient.

BRIEF DESCRIPTION OF THE DRAWINGS

The above and other objects, features, and advantages of embodiments of the present inventive subject matter are further described in the detailed description which follows, with reference to the drawings by way of non-limiting exemplary embodiments of the present inventive subject matter, wherein like reference numerals represent similar parts of embodiments of the present inventive subject matter throughout the several views and wherein.

DETAILED DESCRIPTION

Although the detailed description herein contains many specifics for the purposes of illustration, anyone of ordinary skill in the art will appreciate that many variations and alterations to the following details are within the scope of the embodiments described herein.

Figure 1:
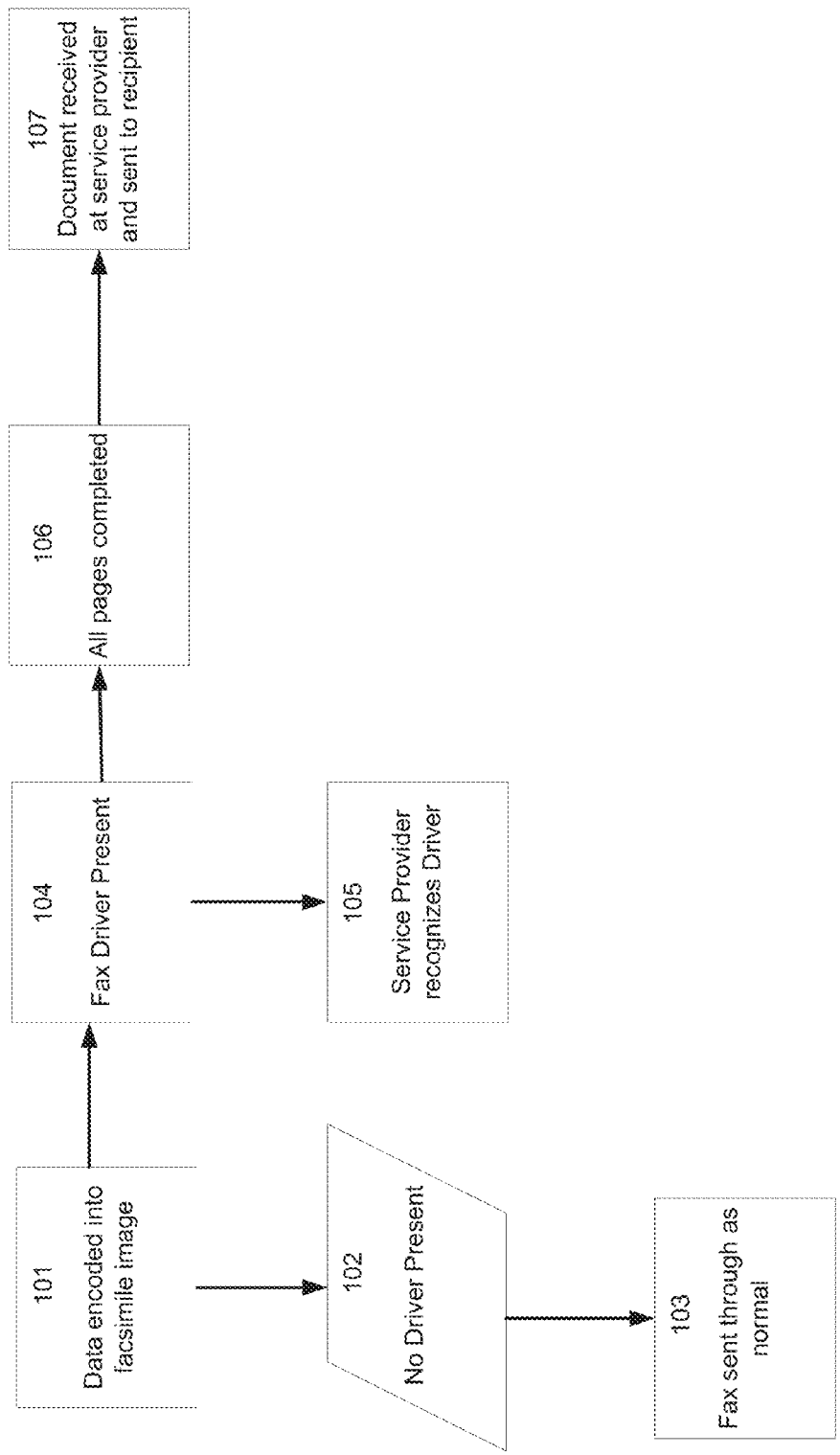
FIG. 1 is a block diagram showing the process of sending a fax from the originating fax system, encoding the digital bits into the image data, the receiving system recognizing the originating source, and confirming that all pages were completely received.
Figure 2:
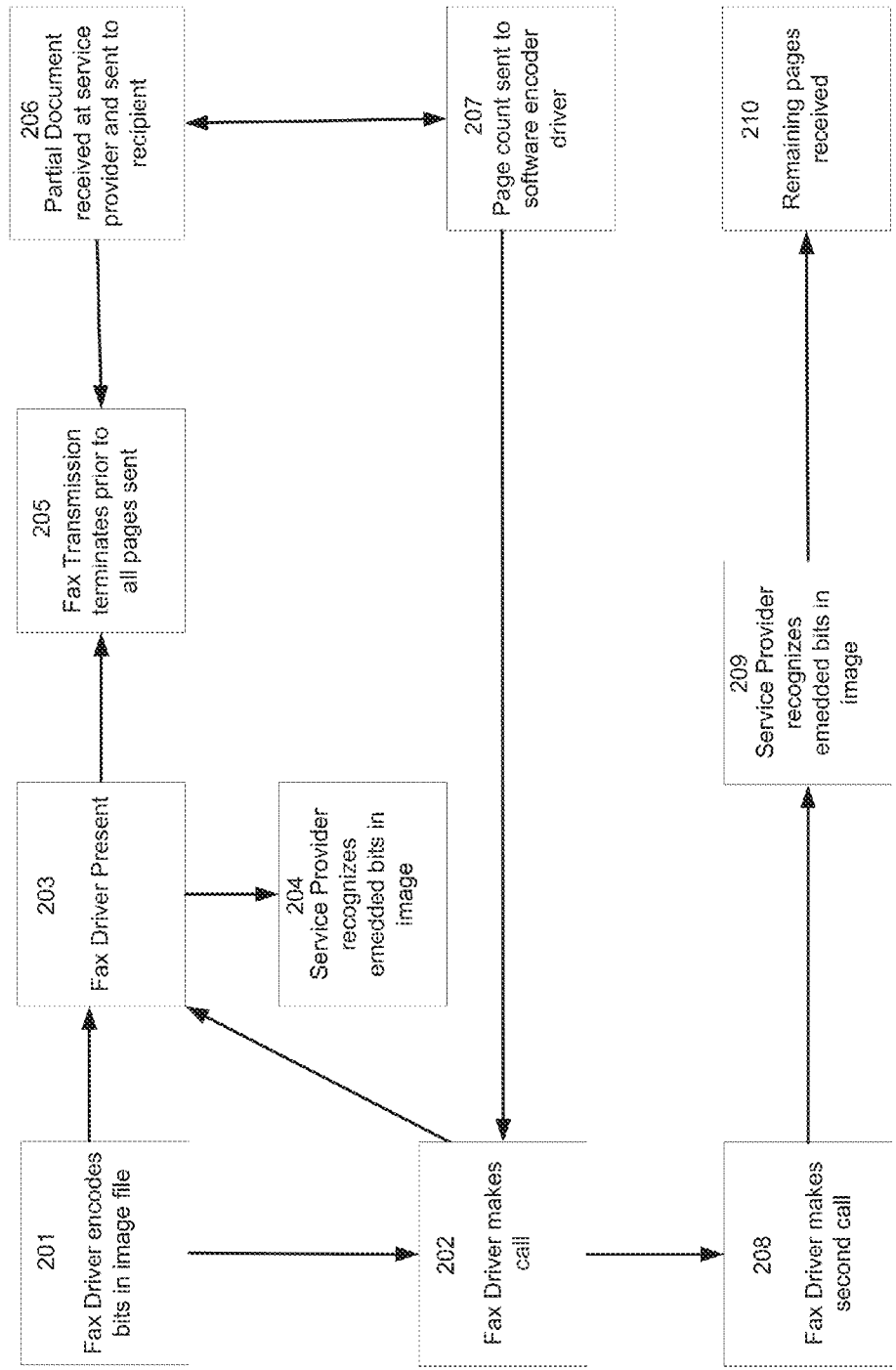
FIG. 2 is a block diagram showing the process of sending a fax from the originating fax system, where the fax software encoder embeds non-facsimile-communication-protocol/non-facsimile-image digital data bits in the facsimile image, wherein the receiving system recognizes the embedded non-facsimile-communication-protocol/non-facsimile-image digital data bits from the software encoder, the transmission is terminated prior to completion of all pages, and the received page count is sent to the software encoder driver.
Figure 3:
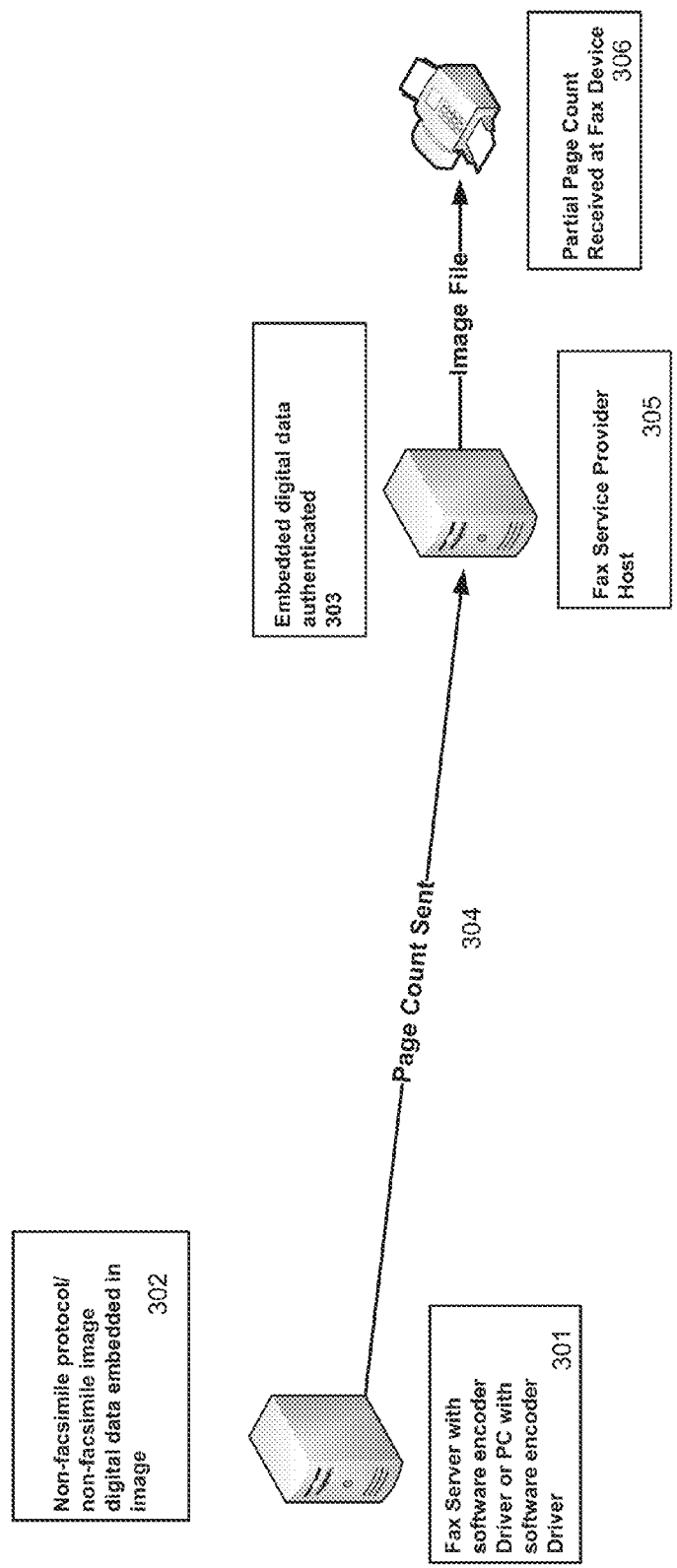
FIG. 3 is a diagram showing the originating fax server with a standard fax call connection to a remote service provider, the fax software encoder embeds non-facsimile-communication-protocol/non-facsimile-image digital data bits in the facsimile image, the transmission is terminated prior to completion of all pages, and the partial page count is sent to the receiving fax device.
Figure 4:
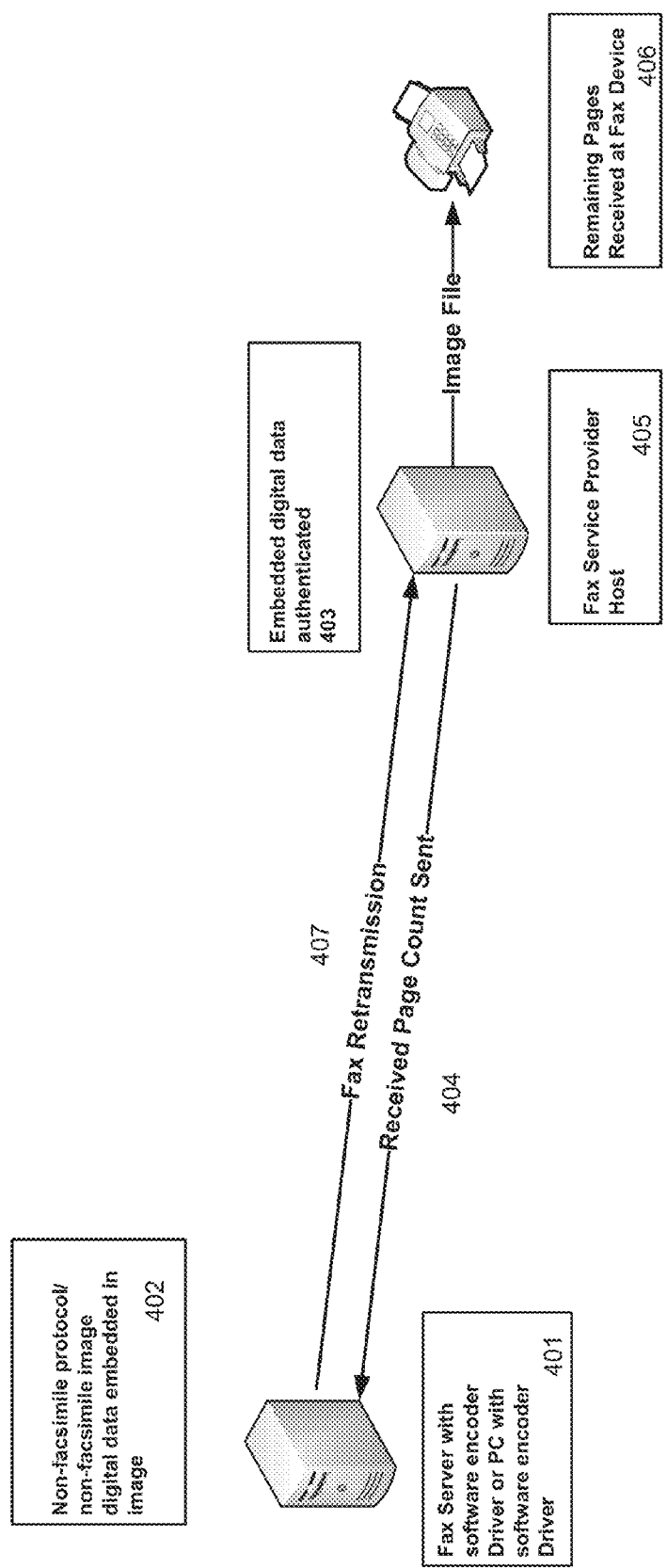
FIG. 4 is a diagram showing the originating fax server with a standard fax call connection to a remote service provider, the fax software encoder embeds non-facsimile-communication-protocol/non-facsimile-image digital data bits in the facsimile image, the partial page count sent from the receiving software decoder program to the sending software encoder program, and a second fax transmission set up commencing at the first page that was not successfully transmitted.

FIG. 1 is a block diagram of a fax communications system with capabilities according to one embodiment of the inventive subject matter. This system is based on the ability to embed non-facsimile-communication-protocol/non-facsimile-image digital data bits into a facsimile image data which communicates to the receiving system the number of pages of the image file such that the receiving system is aware of the total expected number of pages in the image file, which is information not contained in the T.30 fax protocol.

Referring to the block diagrams in FIGS. 1-2 and FIGS. 3-4, initially the sender's fax originates from a computer based file that is converted to a facsimile image data 101 by a fax program in fax driver 201 that resides either on an individual computer, or a network based computer fax server 301. If the fax driver is detected as being present 104 in FIG. 1 or 203 in FIG. 2, the fax program initiates a call 202 to a receiving fax system. If the receiving fax system is a standard fax machine, or a fax service that does not have the supplied fax program in the fax driver 102, then the fax is transmitted as a normal T.30 fax 103 if connected to the Public Switched Telephone Network (PSTN) or T.38 fax is connected to a data communications network such as the internet.

The sender's fax program encodes hidden bits into the fax image file 201 or digital data embedded into the fax image 302. If the fax call is answered by any fax service 105, such as a public or private service provider 305, or any customer owned fax system with a compatible fax program the encoded bits in the fax image will be recognized 204, and authenticated 303 so that the receiving fax program will know the number of pages contained in the image file 304. The hidden bits may also signal the software decoder program the number of bytes that are contained in the image file, the date and time of the transaction, and may contain a unique identifier code for other uses.

In addition, the sending software encoder program may send a message to the receiving decoder program using the CSID or NSF fields of the T.30 protocol to signal the decoder program to perform the functions as if there were bits encoded in the facsimile image.

At this point, the fax transmission call is processed; in the case where all of the expected pages are transmitted 106, the document is received at the service provider 107 and forwarded on to the intended recipient. If the fax transmission call is terminated prior to completion of all expected pages 205 for any reason, the page count of the number of pages successfully received is sent from the software decoder program back 207 to the originating software encoder program. The pages that were successfully received are sent on to the designated final destination facsimile device 206 in FIGS. 2 and 306 in FIG. 3.

After the software encoder 401 program receives the page count from the software decoder program, 404 the fax driver makes a second call, 208 and the software encoder program then prepares the follow on, or retransmission of the original document commencing at the first page that was not successfully transmitted, and also encodes non-facsimile protocol/non-facsimile image data into the image document 402 reflecting the revised page count.

The fax retransmission 407 is then commenced, the embedded digital data bits are recognized 209 and authenticated 403 by the fax service provider 405, the remaining pages of the document are received 210 at the service provider, and the remaining pages are sent on to the destination receiving fax device 406.

Should the second fax transmission also terminate unexpectedly prior to all pages being successfully transmitted, the same procedures described above will be implemented again without any special instructions because these procedures are automated by the fax software encoder driver.

These illustrative embodiments are set forth without any loss of generality to, and without imposing limitations upon, the claimed inventive subject matter.

What is claimed is:

1. A facsimile based computer readable medium encoded with a computer executable instruction performing an intelligent retransmission of an incomplete facsimile transmissions comprising:
    a software encoder program on the computer readable medium comprising the capability to
       encode non-facsimile-image digital data bits in a facsimile image data,
       possess information of
          a number of pages in the facsimile image data,
          a unique identifier of the facsimile image data,
          a unique identifier of the software encoder program,
          a date and a time of a facsimile transmission;
    a software decoder program on the computer readable medium capable of: authenticating the non-facsimile-image digital data bits in the facsimile image data sent from the software encoder program;
    the software decoder program further informing the software encoder program of the number of pages of a facsimile image received;
    the software encoder program further capable of authenticating
       the number of pages of a facsimile image that were successfully transmitted, and in the case of an incomplete facsimile transmission,
       initiating an automated retransmission of the facsimile image data commencing with the first page that was not successfully transmitted to the receiving destination until all pages are transmitted.

2. The software encoder program on computer readable medium as described in claim 1, further comprising:
    a capability to encode non-facsimile-image digital data bits in the facsimile image data that provides a message to the software decoder program comprising one or more of the following:
       an existence of the program,
       the number of pages in the facsimile image data,
       the number of bytes in the facsimile image data,
       the unique identifier code for the facsimile image data,
       the unique identifier of the software encoder program,
       the time of the fax transmission; and the date of the fax transmission.

3. The software decoder program on computer readable medium as described in claim 1, further comprising:
    a capability to authenticate non-facsimile-image digital data bits within the facsimile image data that provides a message received from the software encoder program, further comprising one or more of the following:
       an existence of the program from the sending facsimile,
       the number of pages in the facsimile image data,
       the number of bytes in the facsimile image data,
       the unique identifier code for the facsimile image data,
       the unique identifier of the software encoder program,
       the time of the fax transmission; and the date of the fax transmission.

4. The software encoder program on computer readable medium as described in claim 1,
    further comprising the capability to encode any ITU T.30 defined non-standard capabilities with non-facsimile-image digital data bits, or to encode any ITU T.30 defined facsimile information field with non-facsimile-communication-protocol/non-facsimile-image digital data bits, that provides a message to the software decoder program.

5. The software decoder program on computer readable medium as described in claim 1,
    further comprising the capability to authenticate non-facsimile-image digital data bits in one or more of any defined non-standard capabilities or facsimile information fields of the ITU T.30 specification.

6. The software decoder program on computer readable medium as descried in claim 1 further comprising the capability to detect upon termination of the facsimile telephone call, the number of pages that were successfully transmitted, and further comprising the capability to send a signal to the software encoder program the value of the number of pages that were successfully transmitted during the facsimile telephone call.

7. The software decoder program on computer readable medium as descried in claim 1 further comprising the capability to generate a facsimile message to a recipient of the previous facsimile image data indicating the entire document was not successfully transmitted, and that the remaining pages of the document will be transmitted.

8. The software encoder program on computer readable medium as described in claim 1 further comprising the capability: to receive from the software decoder program a message indicating the number of pages that were successfully transmitted; to prepare the facsimile image data to send the remaining pages that were not successfully transmitted; to initiate a second facsimile transmission telephone call with the remaining pages of the facsimile image data.

9. The software encoder program on computer readable medium as described in claim 1, further comprising: the capability to encode non-facsimile-image digital data bits in the facsimile image data containing the remaining pages not transmitted from the first image document, that provides a message to the software decoder program comprising one or more of the following: the existence of the program from the sending facsimile, the number of pages in the facsimile image data, the number of bytes in the facsimile image data, a unique identifier code for the facsimile image data, a unique identifier of the software encoder program, the time of the fax transmission, and the date of the fax transmission.

10. The software decoder program on computer readable medium as described in claim 1, further comprising: the capability to authenticate non-facsimile-image digital data bits within the facsimile image data containing the remaining pages not transmitted from the first image document, comprising one or more of the following: the existence of the program from the sending facsimile, the number of pages in the facsimile image data, the number of bytes in the facsimile image data, a unique identifier code for the facsimile image data, a unique identifier of the software encoder program, the time of the fax transmission, and the date of the fax transmission.

11. A method for a facsimile based computer readable medium encoded with a computer executable instruction to perform an intelligent retransmission of incomplete facsimile transmissions comprising:
  a software encoder program on computer readable medium comprising the capability to encode non-facsimile-image digital data bits in the facsimile image data, the digital data bits comprising one or more of the following:
    a number of pages in the facsimile image data,
    a unique identifier of the facsimile image data,
    a unique identifier of the software encoder program,
    a date and time of the facsimile transmission;
  a software decoder program on computer readable medium capable of: authenticating the non-facsimile-image digital data bits in the facsimile image data sent from the software encoder program;
  the software decoder program further informing the software encoder program of the number of pages of a facsimile image data received;
  the software encoder program further capable of authenticating the number of pages of a facsimile image that were successfully transmitted, and in the case of an incomplete facsimile transmission, initiating an automated retransmission of the facsimile image data commencing with the first page that was not successfully transmitted to the receiving destination until all pages are transmitted.

12. The method as in claim 11 wherein the software encoder program encodes non-facsimile-image digital data bits in the facsimile image data that provides a message to the software decoder program comprising one or more of the following: the existence of the program from the sending facsimile, the number of pages in the facsimile image data, the number of bytes in the facsimile image data, a unique identifier code for the facsimile image data, a unique identifier of the software encoder program, the time of the fax transmission, and the date of the fax transmission.

13. The method as in claim 11 wherein the software decoder programs non-facsimile-image digital data bits within the facsimile image data that provides a message received from the software encoder program, further comprising one or more of the following: the existence of the program from the sending facsimile, the number of pages in the facsimile image data, the number of bytes in the facsimile image data, a unique identifier code for the facsimile image data, a unique identifier of the software encoder program, the time of the fax transmission, and the date of the fax transmission.

14. The method as in claim 11 wherein the software encoder program may encode any ITU T.30 defined non-standard capabilities with non-facsimile-image digital data bits, or to encode any ITU T.30 defined facsimile information field with non-facsimile-communication-protocol/non-facsimile-image digital data bits, that provides a message to the software decoder program.

15. The method as in claim 11 wherein the software decoder program receives and authenticates non-facsimile-image digital data bits in one or more of any defined non-standard capabilities or facsimile information fields of the ITU T.30 specification.

16. The method as in claim 11 wherein the software decoder program detects upon termination of a facsimile telephone call, the number of pages that were successfully transmitted and sends a signal to the software encoder program containing the value of the number of pages that were successfully transmitted during the facsimile telephone call.

17. The method as in claim 11 wherein the software decoder program generates a facsimile message to a recipient of the previous facsimile image indicating the entire document was not successfully transmitted, and that the remaining pages of the document will be transmitted.

18. The method as in claim 11 wherein
  the software encoder program receives from the software decoder program a message indicating the number of pages that were successfully transmitted;
  prepares the facsimile image data to send the remaining pages that were not successfully transmitted; and
  initiates a second facsimile transmission telephone call with the remaining pages of the facsimile image data.

19. The method as in claim 11 wherein the software encoder program on computer readable medium encodes non-facsimile-image digital data bits in the facsimile image data containing the remaining pages not transmitted from the first image document, that provides a message to the software decoder program comprising one or more of the following: the existence of the program from the sending facsimile, the number of pages in the facsimile image data, the number of bytes in the facsimile image data, a unique identifier code for the facsimile image data, a unique identifier of the software encoder program, the time of the fax transmission, and the date of the fax transmission.

20. The method of claim 11 wherein the software decoder program authenticates non-facsimile-image digital data bits within the facsimile image data containing the remaining pages not transmitted from the first image, that provides a message received from the software encoder program, further comprising one or more of the following: the existence of the program from the sending facsimile, the number of pages in the facsimile image data, the number of bytes in the facsimile image data, a unique identifier code for the facsimile image data, a unique identifier of the software encoder program, the time of the fax transmission, and the date of the fax transmission.

* * * * *